(12) United States Patent
Monden et al.

(10) Patent No.: US 11,539,223 B2
(45) Date of Patent: Dec. 27, 2022

(54) CHARGING/DISCHARGING APPARATUS

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Yukitaka Monden, Kawasaki (JP); Yoichi Morishima, Sumida (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 101 days.

(21) Appl. No.: 17/001,918

(22) Filed: Aug. 25, 2020

(65) Prior Publication Data
US 2021/0083487 A1 Mar. 18, 2021

(30) Foreign Application Priority Data

Sep. 18, 2019 (JP) .............................. JP2019-169769

(51) Int. Cl.
*H02J 7/00* (2006.01)
*H02J 7/34* (2006.01)

(52) U.S. Cl.
CPC ............ *H02J 7/0024* (2013.01); *H02J 7/345* (2013.01); *H02J 2207/50* (2020.01)

(58) Field of Classification Search
CPC ...... H02J 7/0024; H02J 7/345; H02J 2207/50; H02J 2207/20; H02J 7/0013; H02J 7/02; H02J 3/32; H02J 7/0068

USPC .......................................................... 320/128
See application file for complete search history.

(56) References Cited

U.S. PATENT DOCUMENTS

| | | | |
|---|---|---|---|
| 6,727,669 B2 * | 4/2004 | Suzuki ................. | B62D 5/0463 180/446 |
| 7,522,435 B2 * | 4/2009 | Kohnotoh ............... | H02J 7/345 363/78 |
| 9,327,604 B2 | 5/2016 | Toda et al. | |
| 9,431,824 B2 * | 8/2016 | Ishigaki ................. | H02M 3/158 |
| 9,893,648 B2 * | 2/2018 | Kifuji ................... | H02M 7/539 |
| 11,140,760 B2 * | 10/2021 | Han ........................ | H02M 3/07 |
| 2005/0052221 A1 * | 3/2005 | Kohnotoh ............... | H02J 7/345 327/536 |

(Continued)

FOREIGN PATENT DOCUMENTS

| | | | | |
|---|---|---|---|---|
| JP | 2004153990 A | * | 5/2004 | .............. H02M 3/28 |
| JP | 2004215332 A | * | 7/2004 | ................ H02J 7/00 |
| JP | 2005-89096 A | | 4/2005 | |

(Continued)

*Primary Examiner* — M Baye Diao
(74) *Attorney, Agent, or Firm* — Maier & Maier, PLLC

(57) ABSTRACT

A charging/discharging apparatus according to the present embodiment comprises first and second electrode terminals inputting or outputting direct-current power. First to third switching elements are connected in series between the first electrode and the second electrode. A first electric storage is connected in parallel to the second switching element located between the first switching element and the third switching element. A second electric storage is connected in parallel to the third switching element. First to third diodes are respectively connected in antiparallel to the first to third switching elements.

10 Claims, 14 Drawing Sheets

(56) References Cited

U.S. PATENT DOCUMENTS

2013/0134786 A1* 5/2013 Ishigaki .................. H02J 1/00
                                                                307/71
2021/0104903 A1* 4/2021 Zhang ................ H02J 7/00304

FOREIGN PATENT DOCUMENTS

| JP | 5379248 B2 * | 12/2013 | ............ H02M 3/158 |
|----|---|---|---|
| JP | 5877480 B2 | 3/2016 | |
| JP | 2016-82679 A | 5/2016 | |
| JP | 5972785 B2 | 8/2016 | |
| JP | 6183465 B2 | 8/2017 | |

* cited by examiner

CHARGING/DISCHARGING APPARATUS

CROSS REFERENCE TO RELATED APPLICATIONS

This application is based upon and claims the benefit of priority from the prior Japanese Patent Application No. 2019-169769, filed on Sep. 18, 2019, the entire contents of which are incorporated herein by reference.

FIELD

The embodiments of the present invention relate to a charging/discharging apparatus.

BACKGROUND

A power supply device is required to output a large current in a short time or continuously discharge for a long time according to current consumption of an electric load. Charging/discharging apparatuses to be connected to the power supply device have been developed to assist the power supply device. However, in the conventional charging/discharging apparatuses, plural types of storage batteries are switched over by a switch to handle various discharging operations. In this case, while the charging/discharging apparatus can separately charge or discharge these types of storage batteries, the storage batteries cannot be simultaneously used.

In order to solve this problem, it is considered that a converter is provided to each of the types of storage batteries. However, this adversely increases the circuit scale of the charging/discharging apparatus.

DETAILED DESCRIPTION

Figure 1:
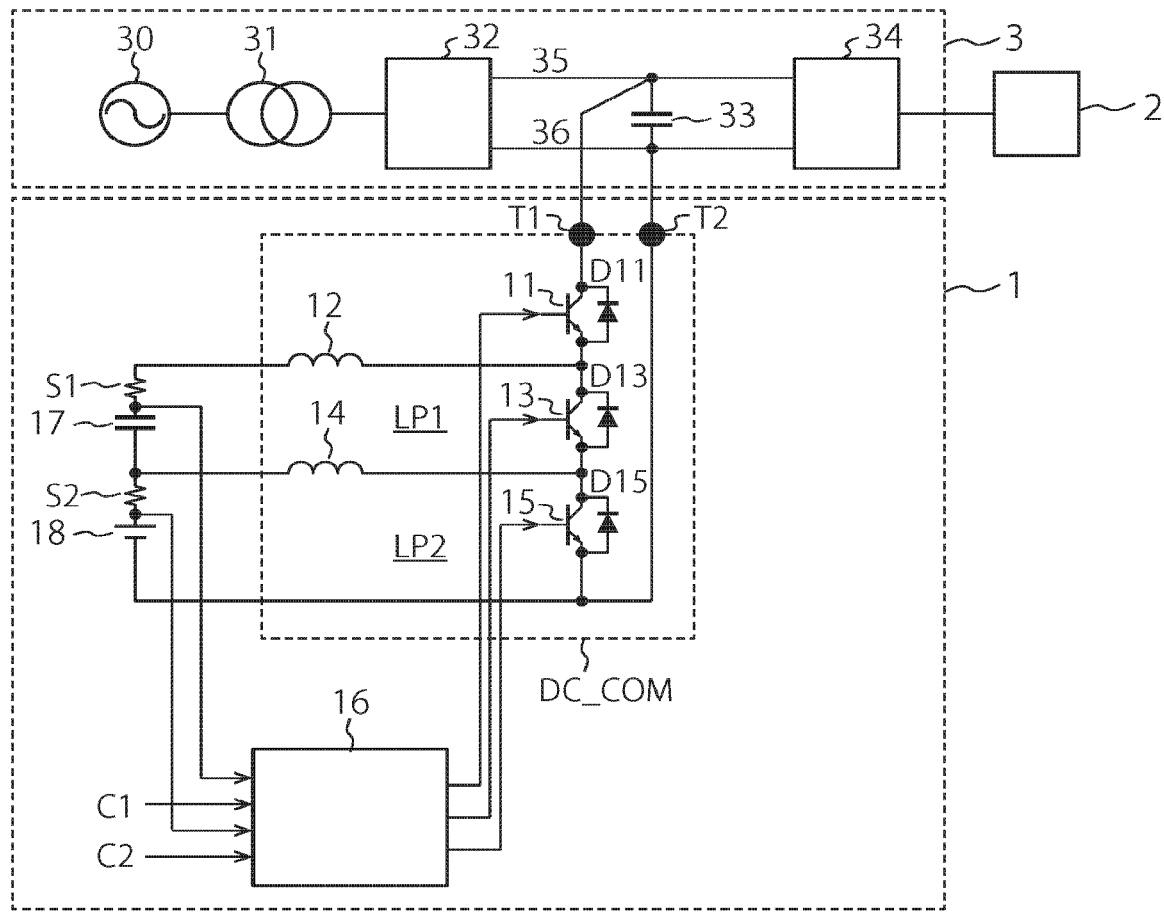
FIG. 1 is a configuration diagram illustrating an example of a charging/discharging apparatus according to a first embodiment.

Embodiments will now be explained with reference to the accompanying drawings. The present invention is not limited to the embodiments. In the present specification and the drawings, elements identical to those described in the foregoing drawings are denoted by like reference characters and detailed explanations thereof are omitted as appropriate.

A charging/discharging apparatus according to the present embodiment comprises first and second electrode terminals inputting or outputting direct-current power. First to third switching elements are connected in series between the first electrode and the second electrode. A first electric storage is connected in parallel to the second switching element located between the first switching element and the third switching element. A second electric storage is connected in parallel to the third switching element. First to third diodes are respectively connected in antiparallel to the first to third switching elements.

First Embodiment

FIG. 1 is a configuration diagram illustrating an example of a charging/discharging apparatus according to a first embodiment. A charging/discharging apparatus 1 according to the present embodiment is connected in parallel to a power supply system 3 that supplies power to an electric load 2 and functions as an auxiliary power supply that can supply electric power to the electric load 2 when electric power from the power supply system 3 is insufficient or the power supply system 3 stops functioning. The electric load 2 may be any device or facility that requires electric power, such as an appliance, an elevator, an electric device used in a railroad, an electric device furnished in a house, a power plant, a sewage treatment facility, or a factory. The electric load 2 may be an electric load that simply consumes electric power or a device, such as an electric motor, that outputs power as an electric generator while stopping.

The power supply system 3 includes a power source 30, a voltage transformer 31, a converter 32, a capacitor 33, and an inverter 34. The power source 30 is an AC power source and may be, for example, an overhead power line or a commercial power source. The voltage transformer 31 has a transforming function to transform a power-supply voltage from the power source 30 into a desired voltage. The converter 32 converts AC power into DC power and supplies the DC power to power supply lines 35 and 36. The capacitor 33 is provided to eliminate AD components (voltage ripple) generated in the DC power transferred to the power supply lines 35 and 36. The inverter 34 converts the DC power from the converter 32 into AC power and supplies the AC power to the electric load 2. The power supply system 3 may supply power to a single electric load 2 or may supply power to a plurality of electric loads 2 in parallel.

The charging/discharging apparatus 1 is connected to the power supply lines 35 and 36 between the converter 32 and the inverter 34 and outputs DC power to the power supply lines 35 and 36 or inputs DC power from the power supply lines 35 and 36. The charging/discharging apparatus 1 includes electrode terminals T1 and T2, switching elements 11, 13, and 15, diodes D11, D13, and D15, inductor elements 12 and 14, a first electric storage 17, a second electric storage 18, current sensors S1 and S2, and a controller 16.

The first electrode terminal T1 is connected to the power supply line 35 and the second electrode terminal T2 is connected to the power supply line 36. For example, in a case in which the power supply line 35 is a high-voltage line and the power supply line 36 is a low-voltage line, the electrode terminal T1 is on a high-voltage side and the electrode terminal T2 is on a low-voltage side. Hereinafter, explanations will be described assuming that the electrode terminal T1 is connected to a high-voltage line and the electrode terminal T2 is connected to a low-voltage line.

The switching elements 11, 13, and 15 being first to third switching elements are connected in series in this order between the electrode terminal T1 and the electrode terminal T2. The switching elements 11, 13, and 15 are, for example, switching elements to which a large current can be applied, such as IGBTs (Insulated Gate Bipolar Transistors), respectively. While the switching elements 11, 13, and 15 preferably have substantially same configurations and characteristics, the configurations and the characteristics are not limited thereto.

The collector of the switching element 11 is connected to the electrode terminal T1 and the emitter thereof is connected to the collector of the switching element 13. The emitter of the switching element 13 is connected to the collector of the switching element 15, and the emitter of the switching element 15 is connected to the electrode terminal T2.

The gate electrodes of the switching elements 11, 13, and 15 are connected to the controller 16. The switching elements 11, 13, and 15 are individually switching-controlled (controlled to turn ON/OFF) by gate signals from the controller 16, respectively.

The diode D11 has an anode connected to the emitter (a terminal on the side of the electrode terminal T2) of the switching element 11 and has a cathode connected to the collector (a terminal on the side of the electrode terminal T1) of the switching element 11. That is, the diode D11 is connected in antiparallel to a direction from the high-voltage electrode terminal T1 to the low-voltage electrode terminal T2.

The diode D13 has an anode connected to the emitter (a terminal on the side of the electrode terminal T2) of the switching element 13 and has a cathode connected to the collector (a terminal on the side of the electrode terminal T1) of the switching element 13. That is, the diode D13 is also connected in antiparallel to the direction from the high-voltage electrode terminal T1 to the low-voltage electrode terminal T2.

The diode D15 has an anode connected to the emitter (a terminal on the side of the electrode terminal T2) of the switching element 15 and has a cathode connected to the collector (a terminal on the side of the electrode terminal T1) of the switching element 15. That is, the diode D15 is also connected in antiparallel to the direction from the high-voltage electrode terminal T1 to the low-voltage electrode terminal T2.

The first electric storage 17 is connected in parallel to the switching element 13 and the diode D13 that are connected between the switching element 11 and the switching element 15. The first electric storage 17 is, for example, an electric storage device that can accumulate and discharge electricity, such as a capacitor or a secondary battery. Hereinafter, the explanations will be described assuming the first electric storage 17 is a capacitor.

A capacitor can supply a large current in a short time and also can accumulate (absorb) a large current in a short time. Therefore, the first electric storage 17 can be charged in a short time and thereafter quickly supply electric power to the power supply system 3 for rapid electric power consumption of the electric load 2 to assist the power supply system 3. That is, the first electric storage 17 enables a peak shift operation of the power supply system 3.

The second electric storage 18 is connected between a node between the switching element 13 and the switching element 15 and the electrode terminal T2, and is connected in parallel to the switching element 15 and the diode D15. The second electric storage 18 is also, for example, an electric storage device that can accumulate and discharge electricity, such as a capacitor or a secondary battery. Hereinafter, the following explanations will be described assuming the second electric storage 18 is a secondary battery.

Although being difficult to supply or absorb a large current in a short time, a secondary battery can store a large amount of electric power and continuously supply the electric power for a long time. The secondary battery generally can store a larger amount of electric power than a capacitor. Therefore, when the power source 30 cannot be used due to power outage or the like, the second electric storage 18 can continuously supply electric power to the electric load 2 via the power supply system 3 or can charge the first electric storage 17 for the peak shift operation.

By using electric storage devices having different characteristics as the first and second electric storages 17 and 18 in this manner, the first and second electric storages 17 and 18 can be used for different purposes, respectively. For example, when the electric load 2 consumes a large current (a peak current) above a preset current target value, the current from the power source 30 is kept equal to or lower than the current target value by discharging electricity from the first electric storage 17 to be added to the current from the power source 30. Accordingly, the first electric storage 17 can be used as a peak-shift power source for the power source 30. That is, the power supply system 3 can perform the peak shift operation. Meanwhile, a capacitor is less than a secondary battery in the amount of storable electric power. Therefore, when the power source 30 fails or the like, there may be a case in which the first electric storage 17 cannot continuously supply electric power to the power supply system 3 or cannot supply electric power for many times of the peak shift operation of the power supply system 3. In order to solve this problem, when the power source 30 fails or the like, the second electric storage 18 continuously supplies control electric power for the electric load 2. Along therewith, the second electric storage 18 charges the first electric storage 17 in a period in which the electric load 2 is not consuming a large current above the current target value. Accordingly, the first electric storage 17 supplies a current to the power supply system 3 to enable the peak shift operation of the power supply system 3 when the electric load 2 next consumes a peak current above the current target value. That is, the charging/discharging apparatus 1 charges the first and second electric storages 17 and 18 when the power source 30 is normally functioning and, on the contrary, continuously enables the peak shift operation of the power supply system 3 while controlling the electric load 2 and charging the first electric storage 17 when the power source 30 fails.

The charging/discharging apparatus 1 can be widely applied to fluctuation of power consumption of any electric load 2 without being limited to the peak shift operation of the power supply system 3.

The inductor element (a reactor) 12 being a first inductor element is interposed in a first loop LP1 constituted by the switching element 13 or the diode D13 and the first electric storage 17. One end of the inductor element 12 is connected to a node between the switching element 11 and the switching element 13. The other end of the inductor element 12 is connected to one end of the first electric storage 17.

The inductor element (a reactor) 14 being a second inductor element is interposed in a second loop LP2 constituted by the switching element 15 or the diode D15 and the second electric storage 18. One end of the inductor element 14 is connected to the node between the switching element 13 and the switching element 15. The other end of the inductor element 14 is connected between the other end of the first electric storage 17 and one end of the second electric storage 18.

The current sensor S1 is provided at one end on the high-voltage side of the first electric storage 17 and detects a current with which the first electric storage 17 is charged or a current discharged from the first electric storage 17. The current sensor S1 notifies the controller 16 of a current measurement value IS1. In the present embodiment, the polarity of the current measurement value IS1 is assumed to be positive at the time of discharging.

The current sensor S2 is provided at one end on the high-voltage side of the second electric storage 18 and detects a current with which the second electric storage 18 is charged or a current discharged from the second electric storage 18. The current sensor S2 notifies the controller 16 of a current measurement value IS2. In the present embodiment, the polarity of the current measurement value IS2 is assumed to be positive at the time of discharging.

The controller 16 is connected to the gate electrodes of the switching elements 11, 13, and 15 and switching-controls (controls to turn ON/OFF) each of the switching elements 11, 13, and 15. Upon receipt of current command values C1 and C2 and the current measurement values IS1 and IS2 from the current sensors S1 and S2, the controller 16 generates gate signals for switching-controlling the switching elements 11, 13, and 15, respectively, on the basis of the current command values C1 and C2 and the current measurement value IS1 and IS2. The current command values C1 and C2 are output from a command device (not illustrated, for example, a computer) located inside or outside the charging/discharging apparatus 1. The controller 16 periodically repeats turning ON/OFF of the switching elements 11, 13, and 15 at certain frequencies and adjusts currents flowing through the switching elements 11, 13, and 15 by changing duty ratios. The duty ratio is the ON time/one period (one period=the ON time+the OFF time) of each of the switching elements 11, 13, and 15. Therefore, by analogously changing the duty ratio from zero to a value less than 1 using the controller 16, the ON time in one period including ON and OFF of each of the switching elements 11, 13, and 15 can be changed to adjust the current flowing through each of the switching elements 11, 13, and 15. A state in which the duty ratio is zero indicates that the switching element 11, 13, or 15 continues the OFF state for one period. A state in which the duty ratio is 1 indicates that the switching element 11, 13, or 15 continues the ON state for one period.

The charging/discharging apparatus 1 may be configured as one device or one system. Alternatively, the switching elements 11, 13, and 15, the diodes D11, D13, and D15, and the inductor elements 12 and 14 may be configured as one DC converter DC_COM. In this case, the first electric storage 17, the second electric storage 18, and the controller 16 are externally attached to the DC converter DC_COM.

If there is no loss in power conversion by the converter 32 and the inverter 34 and input electric power and output electric power of the power supply system 3 are equal, the voltages of the power supply lines 35 and 36 are constant. Further, because the converter 32 is normally controlled to cause the voltages of the power supply lines 35 and 36 to be constant, the converter 32 adjusts lacking electric power or redundant electric power of the power supply lines 35 and 36 when the output electric power of the inverter 34 changes according to consumed electric power of the electric load 2. However, when electric power is to be supplied at the time of the peak shift operation or power outage rapidly requiring a large current, the converter 32 cannot adjust lacking electric power and accordingly the charging/discharging apparatus 1 compensate for the lack of electric power. The operation of the charging/discharging apparatus 1 is explained below.

Figure 2:
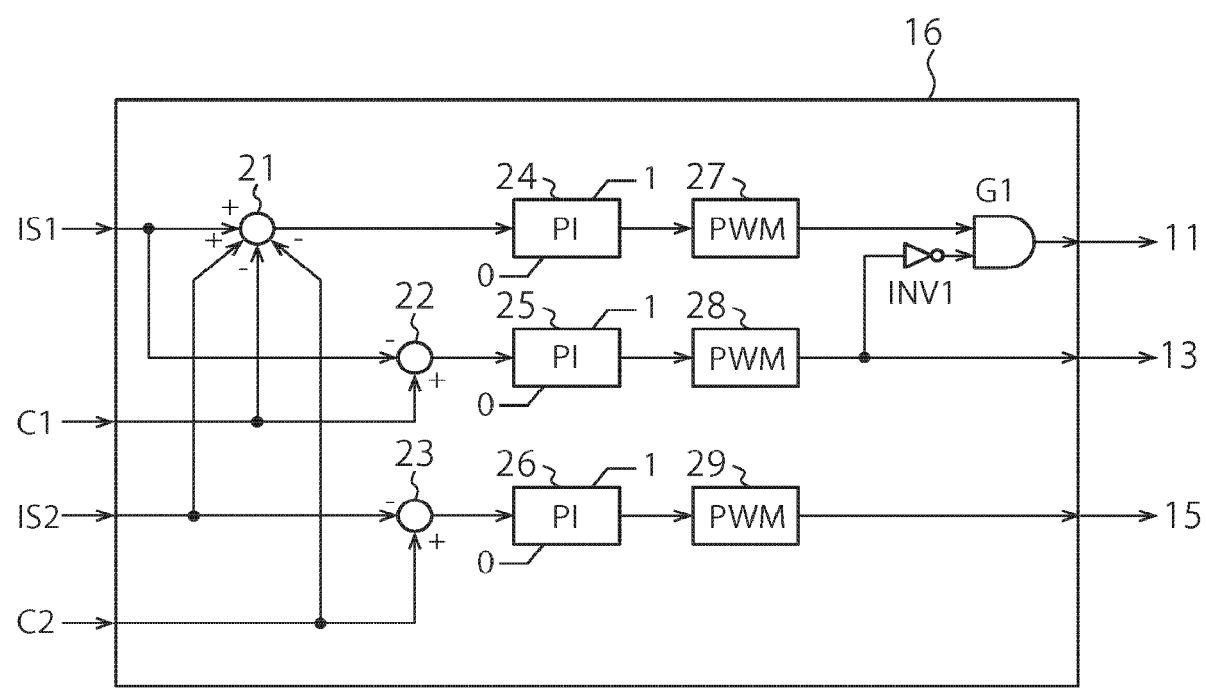
FIG. 2 is a diagram illustrating an example of an internal function of the controller.

FIG. 2 is a diagram illustrating an example of an internal function of the controller 16. FIGS. 3 to 11 are conceptual diagrams illustrating examples of a charging operation or a discharging operation. The operation of the charging/discharging apparatus 1 according to the present embodiment is explained with reference to FIGS. 2 to 11. As illustrated in FIG. 2, the controller 16 includes adders 21 to 23, PI (Proportional Integral) calculators 24 to 26, PWM (Pulse Width Modulation) calculators 27 to 29, an inverter circuit INV1, and an AND gate G1. The configuration of the controller 16 illustrated in FIG. 2 is merely an example and is not particularly limited. The controller 16 may have other circuit configurations having an identical function.

(Operation to Charge First and Second Electric Storages 17 and 18)

Figure 3:
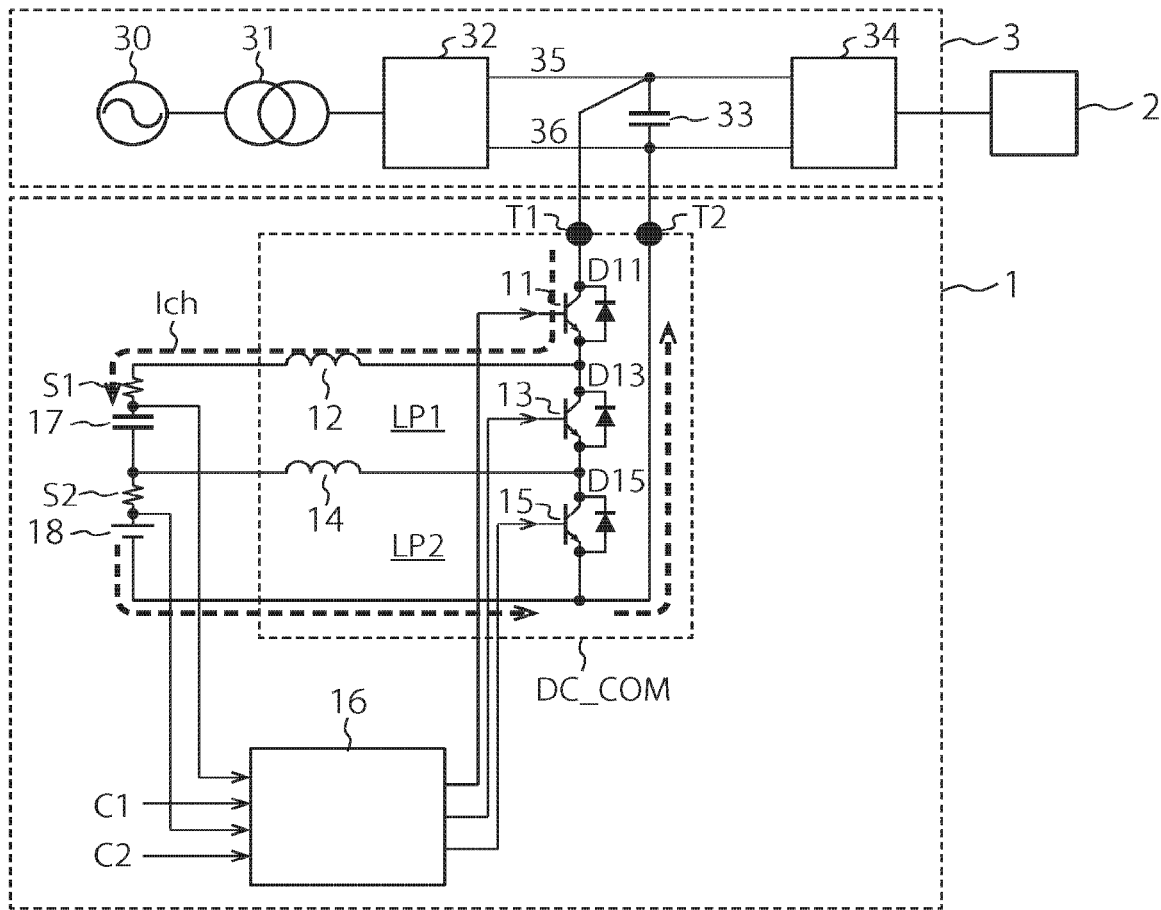
FIGS. 3 to 11 are conceptual diagrams illustrating examples of a charging operation or a discharging operation.

FIG. 3 is a conceptual diagram illustrating an example of an operation to charge both the first and second electric storages 17 and 18. When electric power from the power source 30 in FIG. 3 is normally supplied to the electric load 2, the charging/discharging apparatus 1 can receive electric power via the power supply lines 35 and 36 of the power supply system 3 and charge the first and second electric storages 17 and 18. When both the first and second electric storages 17 and 18 are to be charged, the controller 16 increases the duty ratio of the switching element 11 to raise the ratio of the ON state while the duty ratios of the switching elements 13 and 15 are kept low (almost the OFF state). Accordingly, one end of the first electric storage 17 is connected to the electrode terminal T1 via the switching element 11 and the inductor element 12. Therefore, the first and second electric storages 17 and 18 are connected in series between the electrode terminal T1 and the electrode terminal T2 and are charged from the power supply lines 35 and 36 of the power supply system 3. Dashed arrows Ich in FIG. 3 indicate a charge current. At that time, a voltage in the opposite direction is applied to the diodes D11, D13, and D15 and almost no current flows therein.

This charging operation is explained here with reference to FIG. 2. The adder 21 receives the measurement value IS1 of the charge/discharge current for the first electric storage 17 detected by the current sensor S1 and the measurement value 152 of the charge/discharge current for the second electric storage 18 detected by the current sensor S2 and adds these values, and further receives the current command value C1 for the first electric storage 17 and the current command value C2 for the second electric storage 18 and subtracts these values from the addition result. That is, the adder 21 calculates a difference (IS1+IS2−C1−C2) between the total discharge current for the first and second electric storages 17 and 18 and the sum of the current command values C1 and C2 for the first and second electric storages 17 and 18. The controller 16 controls the DC converter DC_COM to cause this difference (IS1+IS2−C1−C2) to be zero.

As described above, the current measurement values IS1 and 152 and the current command values C1 and C2 have positive values when the first and second electric storages 17 and 18 are discharged, and have negative values when the first and second electric storages 17 and 18 are charged. Therefore, in the charging operation, the current command values C1 and C2 have negative values. The controller 16 controls the switching element 11 to cause the sum of the current measurement values IS1 and IS2 to be a negative value equal to the sum of the current command values C1 and C2. In order to set the current measurement values IS1 and IS2 to negative values, the controller 16 increases the duty ratio of the switching element 11 to lengthen the ON time and causes a large amount of current to flow from the power supply line 35 to the first and second electric storages 17 and 18.

For example, the PI calculator 24 lengthens the rise duration (the high-level duration) of a pulse signal from the PWM calculator 27 to increase the duty ratio (the ON time) of the switching element 11. The pulse signal from the PWM calculator 27 is output to the switching element 11 via the AND gate G1. The AND gate G1 performs an AND operation of the pulse signal from each of the PWM calculator 27 and a pulse signal from the PWM calculator 28. As will be described later, the rise duration (the high-level duration) of the pulse signal from the PWM calculator 28 is shortened and therefore the rise duration (the high-level duration) of the output from the inverter INV1 is inversely lengthened. Accordingly, the rise duration is lengthened in the output of the AND operation of the pulse signals from the PWM calculators 27 and 28. Because this increases the duty ratio of the switching element 11, the time in which the first and second electric storages 17 and 18 are connected in series between the electrode terminal T1 and the electrode terminal T2 is lengthened and the first and second electric storages 17 and 18 are charged through the power supply lines 35 and 36 of the power supply system 3.

Meanwhile, the adder 22 subtracts (C1−IS1) the current measurement value IS1 from the current command value C1. The controller 16 executes feedback control of the switching element 13 to cause this difference (C1−IS1) to be zero. Because the current command value C1 is a negative value in the charging operation, the controller 16 executes feedback control of the switching element 13 to cause the current measurement value IS1 to have the same negative value as the current command value C1. In order to set the current measurement value IS1 to a negative value (to charge the first electric storage 17), the controller 16 decreases the duty ratio of the switching element 13 to shorten the ON time and reduce the duration of short-circuiting of both electrodes of the first electric storage 17.

For example, the PI calculator 25 shortens the rise duration (the high-level duration) of the pulse signal from the PWM calculator 28 to decrease the duty ratio of the switching element 13. Because this decreases the duty ratio of the switching element 13, the ON time of the switching element 13 is shortened and the OFF time is lengthened. As a result, the discharging time of the first electric storage 17 is shortened and the first electric storage 17 is brought to a chargeable state.

The pulse signal from the PWM calculator 28 is inverted by the inverter circuit INV1 and is then input to the AND gate G1. The inverted signal of the pulse signal from the PWM calculator 28 is a pulse signal conversely having a long rise duration (the duty ratio is decreased). Therefore, a period in which the AND gate G1 effectively passes the pulse signal from the PWM calculator 27 is lengthened and the duty ratio of the switching element 11 can be increased according to the pulse signal from the PWM calculator 27.

Similarly, the adder 23 subtracts (C2−IS2) the current measurement value IS2 from the current command value C2. The controller 16 controls the switching element 15 to cause this difference (C2−IS2) to be zero. Because the current command value C2 is a negative value in the charging operation, the controller 16 controls the switching element 15 to cause the current measurement value IS2 to have the same negative value as the current command value C2. In order to set the current measurement value IS2 to a negative value (to charge the second electric storage 18), the controller 16 decreases the duty ratio of the switching element 15 to shorten the ON time and reduce the duration of short-circuiting of both electrodes of the second electric storage 18.

For example, the PI calculator 26 shortens the rise duration (the high-level duration) of a pulse signal from the PWM calculator 29 to decrease the duty ratio of the switching element 15. Because this decreases the duty ratio of the switching element 15, the ON time of the switching element 15 is shortened and the OFF time is lengthened. As a result, the discharging time of the second electric storage 18 is shortened and the second electric storage 18 is brought to a chargeable state.

By increasing the duty ratio (the ON time) of the switching element 11 and decreasing the duty ratios of the switching elements 13 and 15 in this manner, the first and second electric storages 17 and 18 are connected in series between the electrode terminal T1 and the electrode terminal T2 for a longer time and are charged.

(Operation to Charge First Electric Storage 17)

Figure 4:
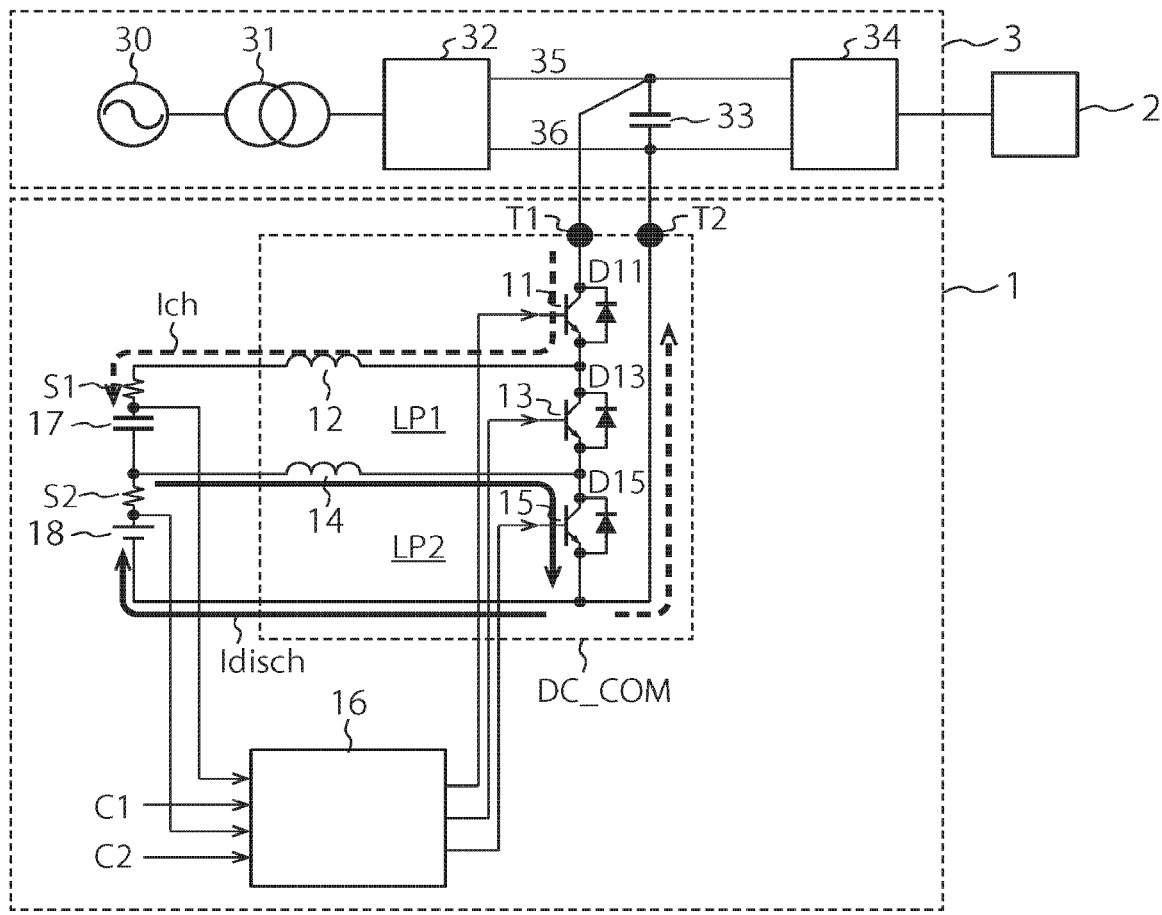

FIG. 4 is a conceptual diagram illustrating an example of an operation to charge the first electric storage 17. When only the first electric storage 17 is to be charged and the second electric storage 18 is not to be charged, the controller 16 increases the duty ratio (the ON time) of the switching element 11 and substantially simultaneously increases also the duty ratio (the ON time) of the switching element 15 to an identical level to that of the switching element 11. The duty ratio of the switching element 13 is kept low. This brings the switching element 15 to the ON state at a substantially same time as the switching element 11 and the loop LP2 short-circuits. When the Loop LP2 short-circuits, a discharge current Idisch flows through the loop LP2 as indicated by solid arrows in FIG. 4. Therefore, the second electric storage 18 is not charged. Meanwhile, the first electric storage 17 is connected between the electrode terminal T1 and the electrode terminal T2 and is charged. The electrode on the low-voltage side of the first electric storage 17 is connected to the electric terminal T2 via the loop LP2 in the short-circuited state.

FIG. 2 is referred to here. Control of the switching elements 11 and 13 is identical to that in the charging operation illustrated in FIG. 3 and explanations thereof are omitted here.

The adder 23 calculates a difference (C2−IS2) between the current command value C2 and the current measurement value IS2. The controller 16 controls the DC converter DC_COM to cause this difference (C2−IS2) to be zero.

Because the second electric storage 18 is not charged in this charging operation, the current command value C2 is set to a positive value similarly in an operation to discharge the second electric storage 18. The controller 16 controls the switching element 15 to cause the current measurement value IS2 to have the same positive value as the current command value C2. In order to set the current measurement value IS2 to a positive value (to discharge the second electric storage 18), the controller 16 increases the duty ratio of the switching element 15 to lengthen the ON time and lengthen the duration of short-circuiting of the both electrodes of the second electric storage 18.

For example, the PI calculator 26 lengthens the rise duration (the high-level period) of the pulse signal from the PWM calculator 29 to increase the duty ratio of the switching element 15. Because this increases the duty ratio of the switching element 15, the ON time of the switching element 15 is lengthened and the OFF time is shortened. As a result, the discharging time of the second electric storage 18 is lengthened and the second electric storage 18 is brought to a discharge state.

Accordingly, at the same time as the first electric storage 17 is charged, the discharge current Idisch in FIG. 4 flows through the second electric storage 18 due to short-circuiting of the loop LP2. Therefore, while the first electric storage 17 is charged with a charge current Ich in FIG. 4, the second electric storage 18 is not charged.

(Operation to Charge Second Electric Storage 18)

Figure 5:
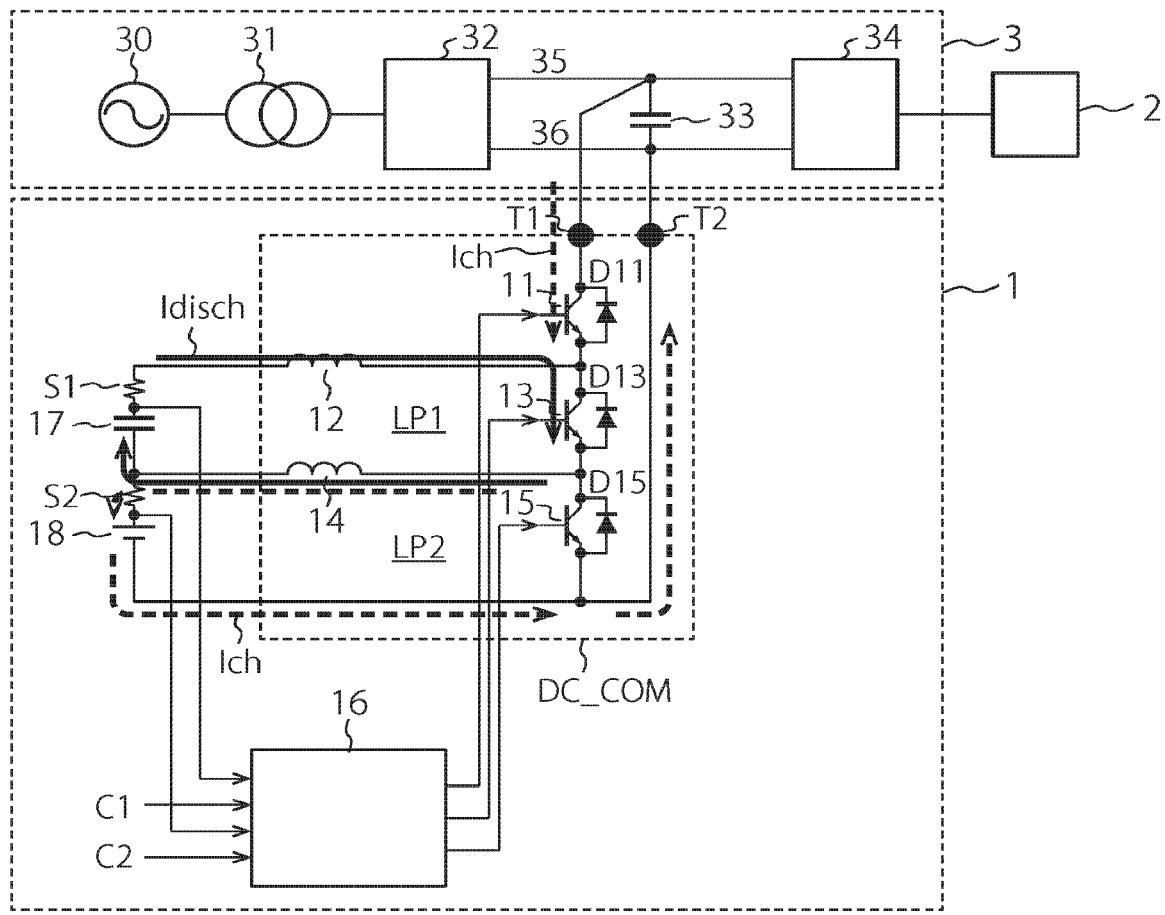

FIG. 5 is a conceptual diagram illustrating an example of an operation to charge the second electric storage 18. When only the second electric storage 18 is to be charged and the first electric storage 17 is not to be charged, the controller 16 increases the duty ratio (the ON time) of the switching element 11 and substantially simultaneously increases also the duty ratio (the ON time) of the switching element 13 to an identical level to that of the switching element 11. The duty ratio of the switching element 15 is kept low. This brings the switching element 13 to the ON state at a substantially same time as the switching element 11 and the loop LP1 short-circuits. When the loop LP1 short-circuits, the discharge current Idisch flows through the loop LP1 as indicated by solid arrows in FIG. 5. Therefore, the first electric storage 17 is not charged. Meanwhile, the second electric storage 18 is connected between the electrode terminal T1 and the electrode terminal T2 and is charged. The electrode on the high-voltage side of the second electric storage 18 is connected to the electrode terminal T1 via the loop LP1 in the short-circuited state.

FIG. 2 is referred to here. Control of the switching elements 11 and 15 is identical to that in the charging operation illustrated in FIG. 3 and explanations thereof are omitted.

The adder 22 calculates a difference (C1−IS1) between the current command value C1 and the current measurement value IS1. The controller 16 controls the DC converter DC_COM to cause this difference (C1−IS1) to be zero.

Because the first electric storage 17 is not charged in this charging operation, the current command value C1 is set to a positive value similarly in an operation to discharge the first electric storage 17. The controller 16 controls the switching element 13 to cause the current measurement value IS1 to have the same positive value as the current command value C1. In order to set the current measurement value IS1 to a positive value (to discharge the first electric storage 17), the controller 16 increases the duty ratio of the switching element 13 to lengthen the ON time and lengthen the duration of short-circuiting of the both electrodes of the first electric storage 17.

For example, the PI calculator 25 lengthens the rise duration (the high-level duration) of the pulse signal from the PWM calculator 28 to increase the duty ratio of the switching element 13. Because this increases the duty ratio of the switching element 13, the ON time of the switching element 13 is lengthened and the OFF time is shortened. As a result, the discharging time of the first electric storage 17 is lengthened and the first electric storage 17 is brought to a discharge state.

Accordingly, at the same time as the second electric storage 18 is charged, the discharge current Idisch in FIG. 5 flows through the first electric storage 17 due to short-circuiting of the loop LP1. Therefore, while the second electric storage 18 is charged with the charge current Ich as indicated by dashed arrows in FIG. 5, the first electric storage 17 is not charged.

The first electric storage 17 may be charged with electric power from the second electric storage 18 or the second electric storage 18 may conversely be charged with electric power of the first electric storage 17, without using electric power from the power source 30. These charging operations will be explained later.

(Operation to Discharge First Electric Storage 17)

Figure 6:
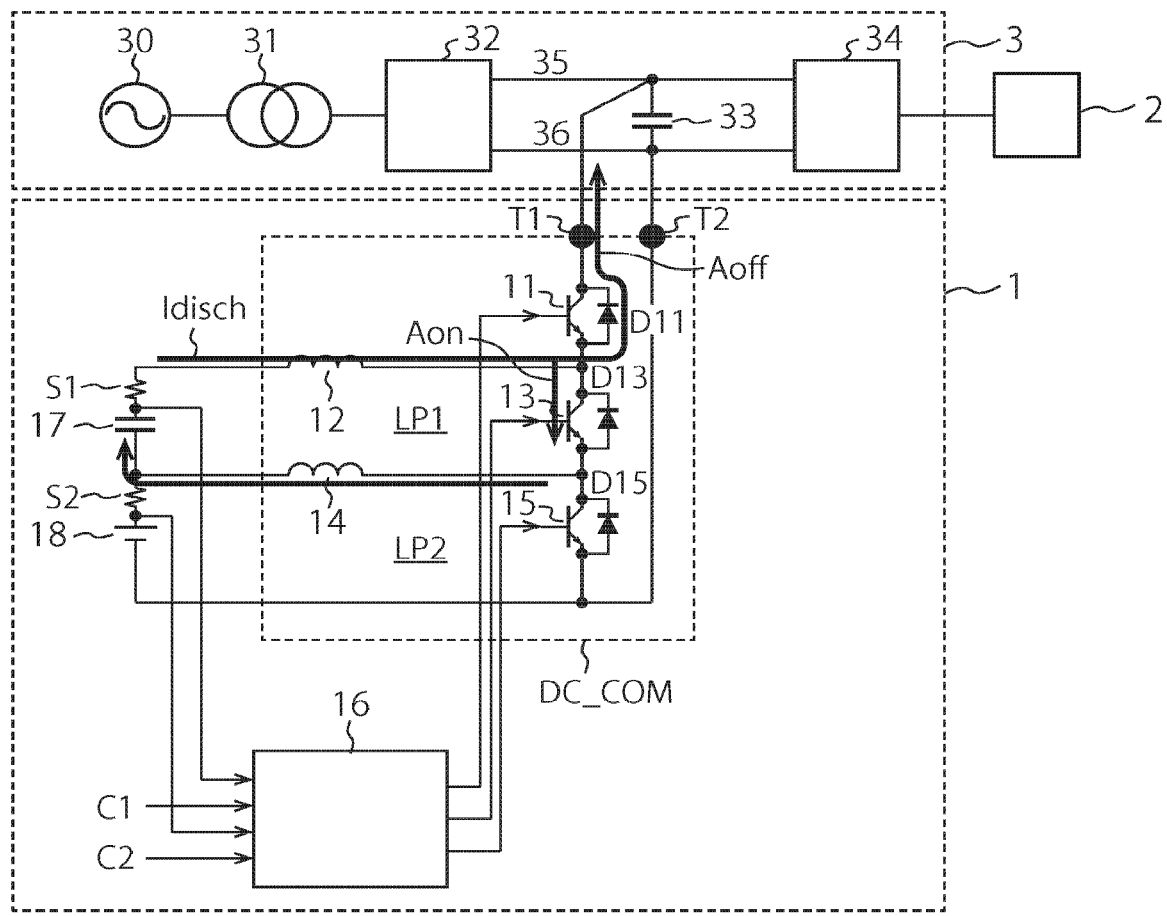

FIG. 6 is a conceptual diagram illustrating an example of an operation to discharge the first electric storage 17. When current consumption of the electric load 2 rapidly increases, the charging/discharging apparatus 1 needs to supply a large current in a short time in response to such a peak current. In order to handle such circumstances, the first electric storage 17 discharges in a short time to supplement a current to the power supply lines 35 and 36 of the power supply system 3. For example, in a case in which the first electric storage 17 is a large-capacity capacitor, the first electric storage 17 can supply a large current to the power supply lines 35 and 36 in a short time. Accordingly, the charging/discharging apparatus 1 can handle a rapid increase in the current consumption while enabling the peak shift operation of the power supply system 3.

When the first electric storage 17 is to be discharged, the controller 16 increases the duty ratio (the ON time) of the switching element 13 to be higher than that of the switching element 11 to increase the ratio of the ON state while keeping the duty ratio of the switching element 11 low (a substantially OFF state). Accordingly, the both electrodes of the first electric storage 17 are short-circuited via the switching element 13 and the inductor elements 12 and 14, and the first electric storage 17 passes a short-circuit current (an arrow Aon) through the loop LP1 when the switching element 13 is in the ON state. When the switching element 13 is thereafter brought to the OFF state, the both electrodes of the first electric storage 17 are opened. However, the inductor element 12 continuously passes the short-circuit current and supplies the current as a discharge current (an arrow Aoff) from the electrode T1 to the power supply line 35 via the diode D11. With repetition of this ON/OFF operation of the switching element 13, the inductor element 12 can supply the short-circuit current from the electrode terminal T1 to the power supply line 35. By increasing the duty ratio of the switching element 13, the current (the discharge current) supplied from the inductor element 12 is also increased.

At this time, the short-circuit current of the inductor element 12 can also be used as a current charging the second electric storage 18. Therefore, the duty ratio of the switching element 15 is changed on the basis of whether to charge the second electric storage 18. For example, when the second electric storage 18 is to be charged, the duty ratio of the switching element 15 is caused to be lower than that of the switching element 13 as will be described later with reference to FIG. 7. This enables the second electric storage 18 to be charged at the same time as the operation to discharge the first electric storage 17.

FIG. 2 is referred to here. The adder 22 calculates a difference (C1−IS1) between the current command value C1 and the current measurement value IS1. The controller 16 executes feedback control of the DC converter DC_COM to cause the difference (C1−IS1) to be zero.

In the operation to discharge the first electric storage 17, the current command value C1 is set to a positive value. The controller 16 executes feedback control of the switching element 13 to cause the current measurement value IS1 to have the same positive value as the current command value C1. In order to set the current measurement value IS1 to a positive value (to discharge the first electric storage 17), the controller 16 increases the duty ratio of the switching element 13 to lengthen the ON time and lengthen the duration of short-circuiting of the both electrodes of the first electric storage 17.

For example, the PI calculator 25 lengthens the rise duration (the high-level duration) of the pulse signal from the PWM calculator 28 to increase the duty ratio of the switching element 13. Because this increases the duty ratio of the switching element 13, the ON time of the switching element 13 is lengthened and the OFF time is shortened. As a result, the discharging time of the first electric storage 17 is lengthened and the first electric storage 17 is brought to the discharge state.

The duty ratio of the switching element 11 changes depending on the magnitude relation between the current command values C1 and C2. However, because the rise duration (the high-level duration) of the pulse signal from the PWM calculator 28 has become long, the period in which the AND gate G1 inhibits output of the pulse signal from the PWM calculator 27 is long. Therefore, when the rise durations of the current command values C1 and C2 are overlapped, the duty ratio of the switching element 11 naturally decreases regardless of the rise duration (the high-level duration) of the current command value C1.

The duty ratio of the switching element 15, that is, the current command value C2 is changed depending on a charge amount of the second electric storage 18. For example, when the charge amount of the second electric storage 18 is too large, the current command value C2 is set to a positive value to increase the duty ratio of the switching element 15. This lengthens the ON time of the switching element 15 (the period in which the loop LP2 is short-circuited) and the short-circuit current of the inductor elements 12 and 14 is hardly applied to the second electric storage 18. The discharge amount of the second electric storage 18 is increased and the charge amount of the second electric storage 18 can be adjusted.

Figure 7:
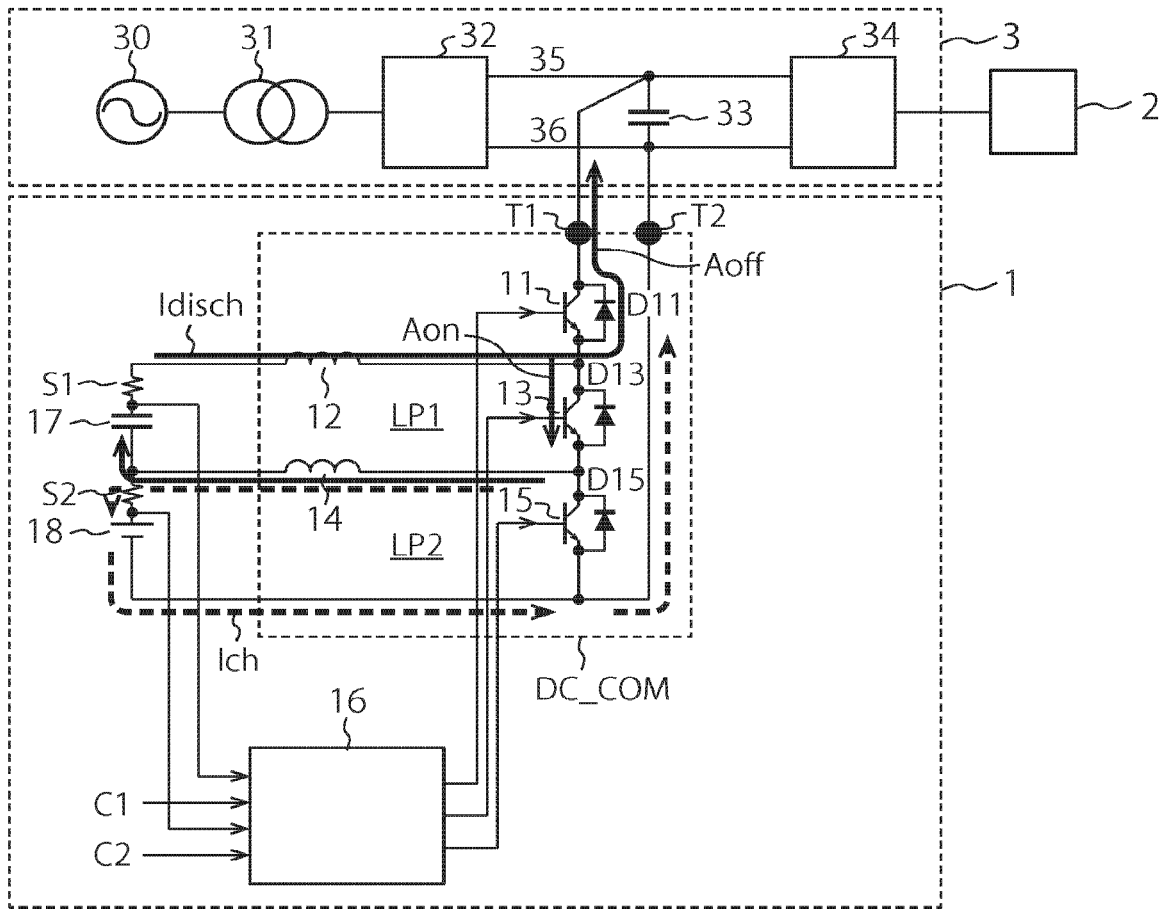

On the other hand, for example, when the second electric storage 18 is to be charged at the same time as an operation to discharge the first electric storage 17, the current command value C2 in FIG. 2 is set to a negative value. FIG. 7 is a conceptual diagram illustrating an example of an operation to discharge the first electric storage 17 and an operation to charge the second electric storage 18. This decreases the duty ratio of the switching element 15 and the short-circuit current of the inductor elements 12 and 14 flowing when the loop LP1 is electrically opened also flows as the charge current Ich as indicated by dashed arrows in FIG. 7, is applied to the second electric storage 18, and can also be used to charge the second electric storage 18. The rest of the operation illustrated in FIG. 7 may be identical to that in the discharging operation in FIG. 6.

(Operation to Discharge Second Electric Storage 18)

Figure 8:
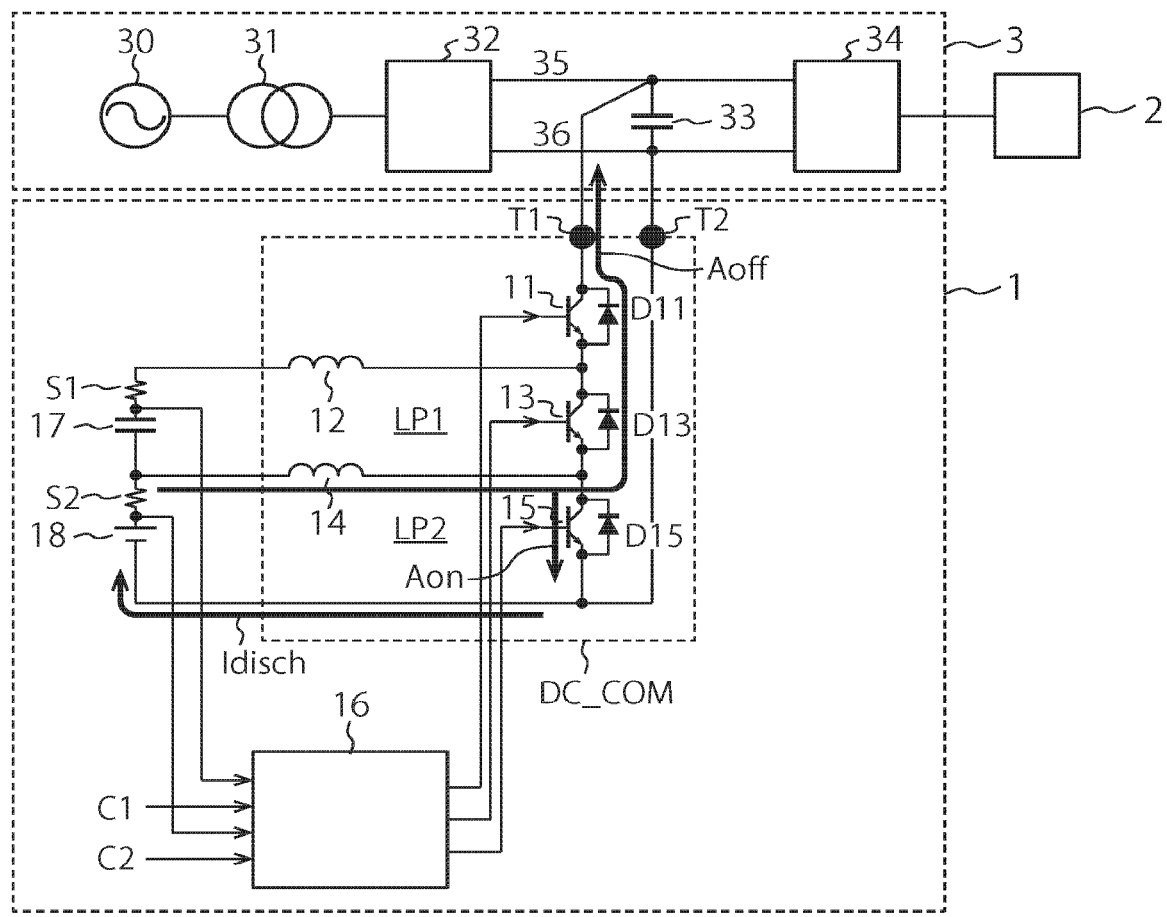

FIG. 8 is a conceptual diagram illustrating an example of an operation to discharge the second electric storage 18. When the power source 30 fails, the charging/discharging apparatus 1 needs to continuously supply a current. In order to handle such circumstances, the second electric storage 18 discharges for a relatively long time to supplement a current to the power supply lines 35 and 36 of the power supply system 3. For example, in a case in which the second electric storage 18 is a secondary battery, the second electric storage 18 can supply a current to the power supply lines 35 and 36 for a relatively long time. Accordingly, the charging/discharging apparatus 1 can supply power to the load 2 at the time of failure of the power source 30. The second electric storage 18 can also charge the first electric storage 17 (for example, a capacitor) and enables the peak shift operation of the power supply system 3.

When the second electric storage 18 is to be discharged, the controller 16 increases the duty ratio of the switching element 15 to be higher than that of the switching element 11 to increase the ratio of the ON state while keeping the duty ratio of the switching element 11 low (a substantially OFF state). Accordingly, when the switching element 15 is in the ON state, the both electrodes of the second electric storage 18 are short-circuited via the switching element 15 and the inductor element 14, and the second electric storage 18 passes a short-circuit current (an arrow Aon) through the loop LP2. When the switching element 15 is thereafter brought to the OFF state, the both electrodes of the second electric storage 18 are opened. However, the inductor element 14 continues to pass the short-circuit current and supplies the current as a discharge current (an arrow Aoff) from the electrode terminal T1 to the power supply line 35 via the diodes D13 and D11. With repetition of this ON/OFF operation of the switching element 15, the inductor element 14 can supply the short-circuit current from the electrode terminal T1 to the power supply line 35. By increasing the duty ratio of the switching element 15, the current (the discharge current) supplied from the inductor element 14 is also increased.

At that time, the short-circuit current of the inductor element 14 can also be used as a current charging the first electric storage 17. Therefore, the duty ratio of the switching element 13 is changed on the basis of whether to charge the first electric storage 17. When the first electric storage 17 is not to be charged, it suffices to increase the duty ratio of the switching element 13 to be identical to that of the switching element 15 as explained with reference to FIG. 5. Accordingly, the both electrodes of the first electric storage 17 are short-circuited and charging of the first electric storage 17 is suppressed. When the first electric storage 17 is to be charged, the duty ratio of the switching element 13 is decreased to be lower than that of the switching element 15 as described later with reference to FIG. 9. This enables the first electric storage 17 to be charged at the same time as the operation to discharge the second electric storage 18.

FIG. 2 is referred to here. The adder 23 calculates a difference (C2-IS2) between the current command value C2 and the current measurement value IS2. The controller 16 controls the DC converter DC_COM to cause this difference (C2-IS2) to be zero.

In the operation to discharge the second electric storage 18, the current command value C2 is set to a positive value. The controller 16 controls the switching element 15 to cause the current measurement value IS2 to have the same positive value as the current command value C2. In order to set the current measurement value IS2 to a positive value (to discharge the second electric storage 18), the controller 16 increases the duty ratio of the switching element 15 to lengthen the ON time and lengthen the duration of short-circuiting of the both electrodes of the second electric storage 18.

For example, the PI calculator 26 lengthens the rise duration (the high-level duration) of the pulse signal from the PWM calculator 29 to increase the duty ratio of the switching element 15. Because this increases the duty ratio of the switching element 15, the ON time of the switching element 15 is lengthened and the OFF time is shortened. As a result, the discharging time of the second electric storage 18 is lengthened and the second electric storage 18 is brought to a discharge state.

The duty ratio of the switching element 11 changes depending on the magnitude relation between the current command values C1 and C2. For example, when the first electric storage 17 is to be charged, the current command value C1 is set to a negative value to decrease the duty ratio of the switching element 13. In this case, it suffices to set the absolute value of the current command value C2 to be larger than that of the current command value C1 and enable the adder 21 to output a negative value. This can also decrease the duty ratio of the switching element 11.

The duty ratio of the switching element 13, that is, the current command value C1 is changed depending on the charge amount of the first electric storage 17. For example, when the charge amount of the first electric storage 17 is too large, the current command value C1 is set to a positive value to increase the duty ratio of the switching element 13. This lengthens the ON time of the switching element 13 (the period in which the loop LP1 is short-circuited) and the short-circuit current of the inductor element 12 is not applied so much to the first electric storage 17. This also increases the discharge amount of the first electric storage 17 and the charge amount of the first electric storage 17 can be adjusted.

Figure 9:
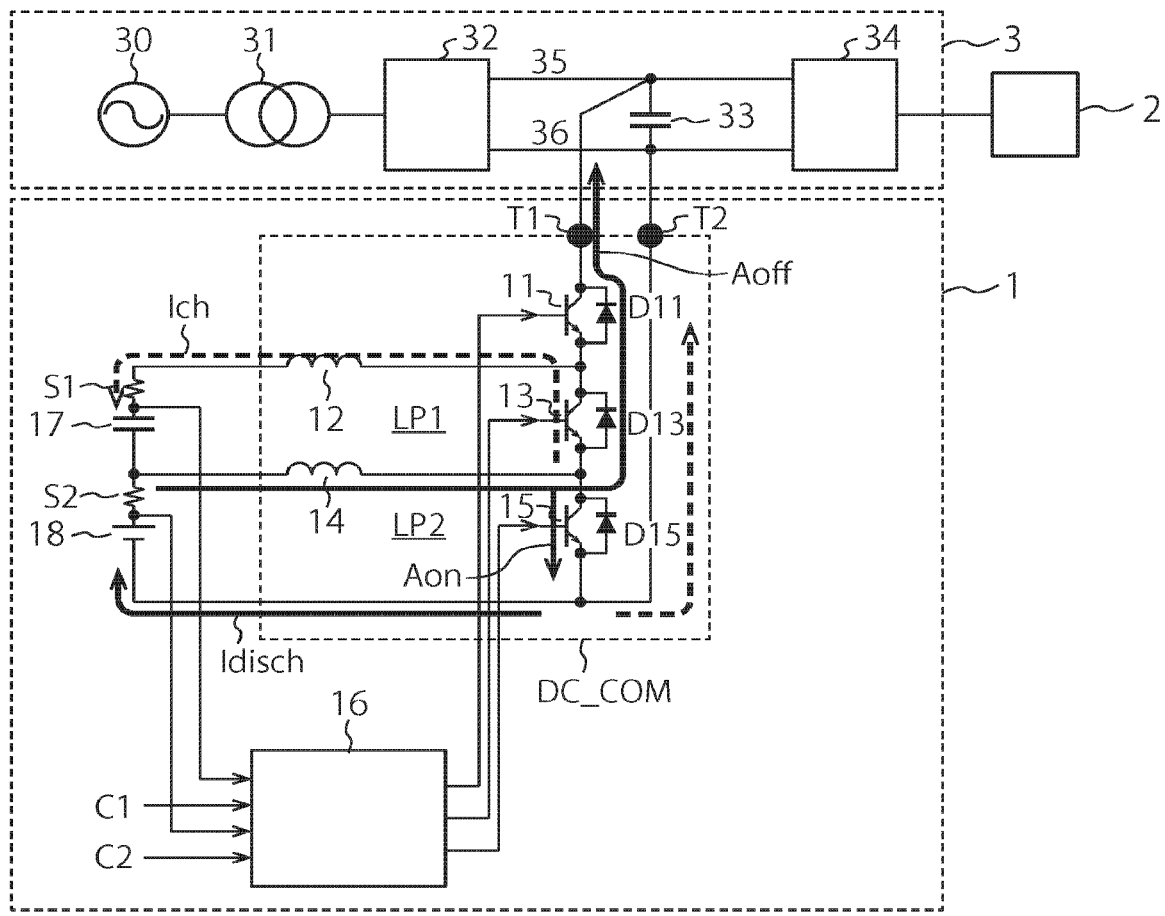

On the other hand, for example, when the first electric storage 17 is to be charged at the same time as the operation to discharge the second electric storage 18, the current command value C1 is set to a negative value. FIG. 9 is a conceptual diagram illustrating an example of an operation to discharge the second electric storage 18 and an operation to charge the first electric storage 17. This decreases the duty ratio of the switching element 13 and the short-circuit current of the inductor element 14 flowing when the loop LP2 is electrically opened also flows as the charge current Ich as indicated by dashed arrows in FIG. 9, is applied to the first electric storage 17 via the diode D13, and can also be used to charge the first electric storage 17. The rest of the operation illustrated in FIG. 9 can be identical to the discharging operation in FIG. 8.

(Operation to Discharge First and Second Electric Storages 17 and 18)

When the first and second electric storages 17 and 18 are both to be discharged, it suffices that the controller 16 increases the duty ratios of both the switching elements 13 and 15. The duty ratio of the switching element 11 may be kept low. That is, it suffices to perform both the operation to discharge the first electric storage 17 in FIG. 6 and the operation to discharge the second electric storage 18 in FIG. 8. This enables both the first and second electric storages 17 and 18 to supply power to the power supply lines 35 and 36.

Because the duty ratio of the switching element 13 is high and the rise duration (the high-level duration) of the pulse signal from the PWM calculator 28 in FIG. 2 is long, the period in which the AND gate G1 inhibits output of the pulse signal from the PWM calculator 27 is long. The PWM calculator 27 may be configured to output no pulse signal in the operation to discharge the first and second electric storages 17 and 18.

(Internal Charging Operation of First or Second Electric Storage 17 or 18)

Figure 10:
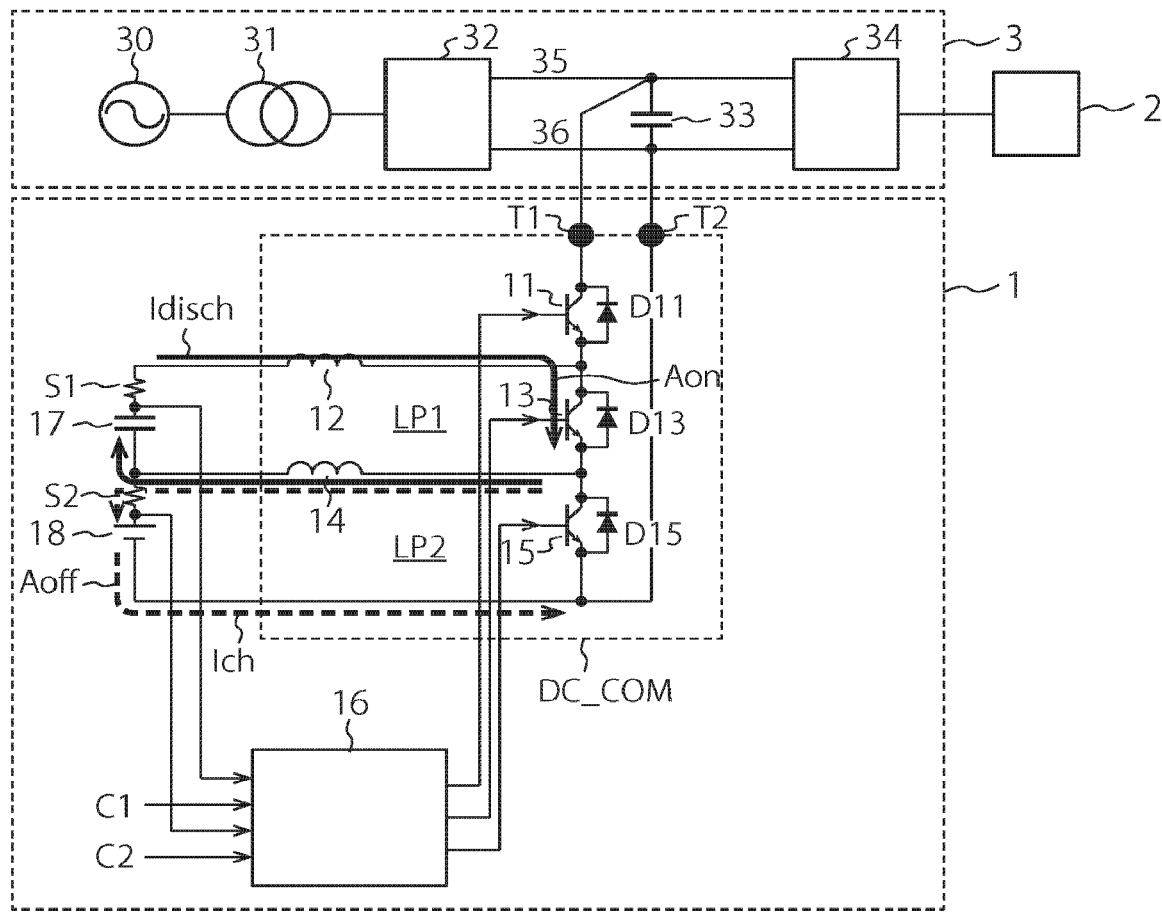

FIG. 10 is a conceptual diagram illustrating an example of an internal charging operation from the first electric storage 17 to the second electric storage 18. For example, when the power supply system 3 normally functions and the voltage of the power supply line 35 is higher than the output voltage of the first or second electric storage 17 or 18, discharging from the first electric storage 17 to the power supply line 35 is not performed even if the controller 16 performs the discharging operation explained with reference to FIG. 7. However, the internal charging operation from the first electric storage 17 to the second electric storage 18 can be performed as illustrated in FIG. 10.

Figure 11:
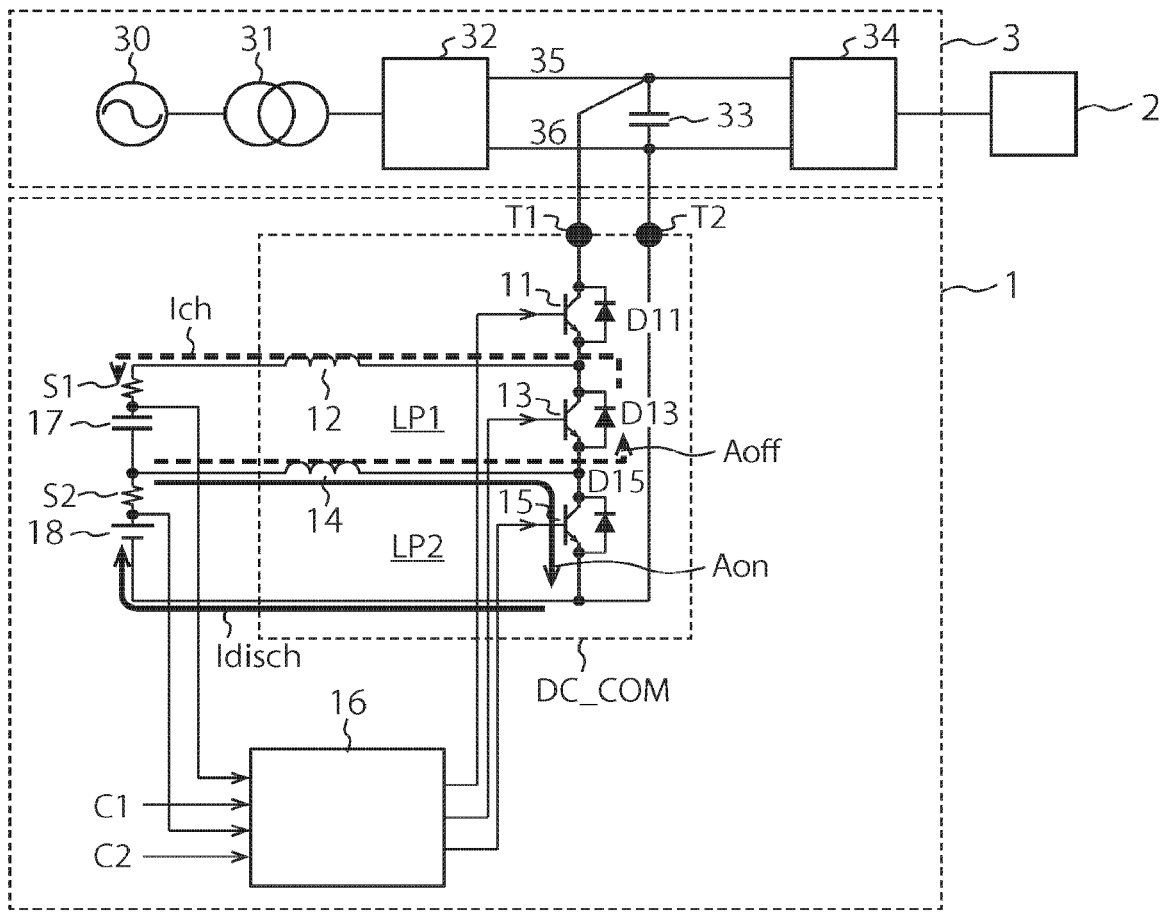

FIG. 11 is a conceptual diagram illustrating an example of an internal charging operation from the second electric storage 18 to the first electric storage 17. For example, when the power supply system 3 normally functions and the voltage of the power supply line 35 is higher than the output voltage of the first or second electric storage 17 or 18, discharging from the second electric storage 18 to the power supply line 35 is not performed even if the switching elements 11, 13, and 15 perform the discharging operation explained with reference to FIG. 9. However, with the discharging operation in FIG. 9 performed by the switching elements 11, 13, and 15, the internal charging operation from the second electric storage 18 to the first electric storage 17 can be performed as illustrated in FIG. 11.

In this way, when the power supply system 3 normally functions, charging or discharging of power may be internally performed between the first electric storage 17 and the second electric storage 18.

(Other Charging/Discharging Operations)

When the output voltage of the first electric storage 17 is lower than the output voltage of the second electric storage 18, the first electric storage 17 can be charged with power of the second electric storage 18 via the diode D13 even if the switching elements 11, 13, and 15 are kept in the OFF state without being switching-controlled.

When the output voltage of the power supply line 35 is lower than the output voltage of the first electric storage 17 and/or the second electric storage 18, power of the first electric storage 17 and/or the second electric storage 18 can be supplied (discharged) to the power supply line 35 via the diodes D13 and D11 even if the switching elements 11, 13, and 15 are kept in the OFF state without being switching-controlled.

As described above, according to the present embodiment, the DC converter DC_COM includes the switching elements 11, 13, and 15 connected in series between the electrode terminal T1 and the electrode terminal T2, and the diodes D11, D13, and D15 connected in parallel to the switching elements 11, 13, and 15, respectively. The first electric storage 17 is connected in parallel to the switching element 13 via the inductor element 12 to constitute the loop LP1. The second electric storage 18 is connected in parallel to the switching element 15 via the inductor element 14 to constitute the loop LP2. The controller 16 can perform various charging operations and various discharging operations by changing the respective duty ratios (the ON times) of the switching elements 11, 13, and 15.

The first and second electric storages 17 and 18 share the DC converter DC_COM. For example, the DC converter DC_COM charges both or one of the first and second electric storages 17 and 18 with electric power from the power supply system 3 via the common electrode terminals T1 and T2 or discharges electric power to the power supply system 3 via the common electrode terminals T1 and T2. In this way, the charging/discharging apparatus 1 according to the present embodiment can be downscaled by sharing the DC converter DC_COM with plural types of electric storages 17 and 18. Further, the charging/discharging apparatus 1 can simultaneously use plural types of electric storages 17 and 18 such as a capacitor and a secondary battery and can perform various charging operations and various discharging operations.

Second Embodiment

Figure 12:
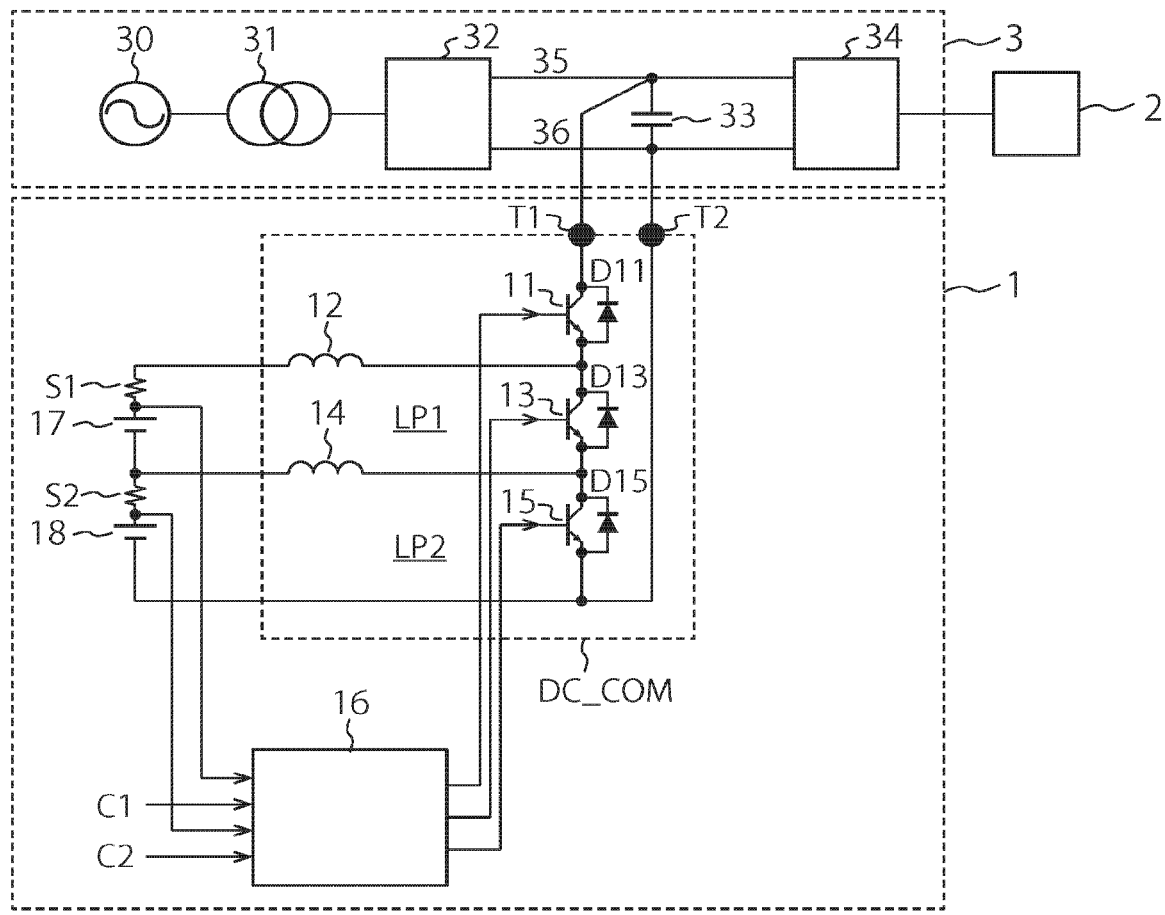
FIG. 12 is a configuration diagram illustrating an example of a charging/discharging apparatus according to a second embodiment.

FIG. 12 is a configuration diagram illustrating an example of a charging/discharging apparatus according to a second embodiment. The charging/discharging apparatus 1 according to the second embodiment is different from that in the first embodiment in that the first electric storage 17 is a secondary battery. Other configurations of the second embodiment may be identical to corresponding ones of the first embodiment.

While the first electric storage 17 may be a secondary battery having same characteristics as those of the second electric storage 18, the first electric storage 17 is preferably a secondary battery having different characteristics from those of the second electric storage 18. This enables the first and second electric storages 17 and 18 to be differently used depending on applications or purposes.

For example, the first electric storage 17 may be a lithium-ion secondary battery that can input and output high power in a short time and the second electric storage 18 may be lithium-ion secondary battery that can charge and discharge a large volume of electric power. Also, in this case, the first electric storage 17 enables the peak shift operation of the power supply system 3. The second electric storage 18 can continuously supply electric power to the power supply system 3 to supplement normal electric power consumption of the electric load 2 at the time of power outage or the like. Alternatively, the second electric storage 18 can charge the first electric storage 17 for the peak shaving operation. Accordingly, the second embodiment can also perform operations identical to those of the first embodiment and obtain identical effects.

Even when the first and second electric storages 17 and 18 are secondary batteries having same characteristics, the degrees of deterioration may differ depending on surrounding environments or usage frequencies. Even in this case, the second embodiment enables the first and second electric storages 17 and 18 to be separately operated and therefore the degrees of deterioration can be uniformized.

Third Embodiment

Figure 13:
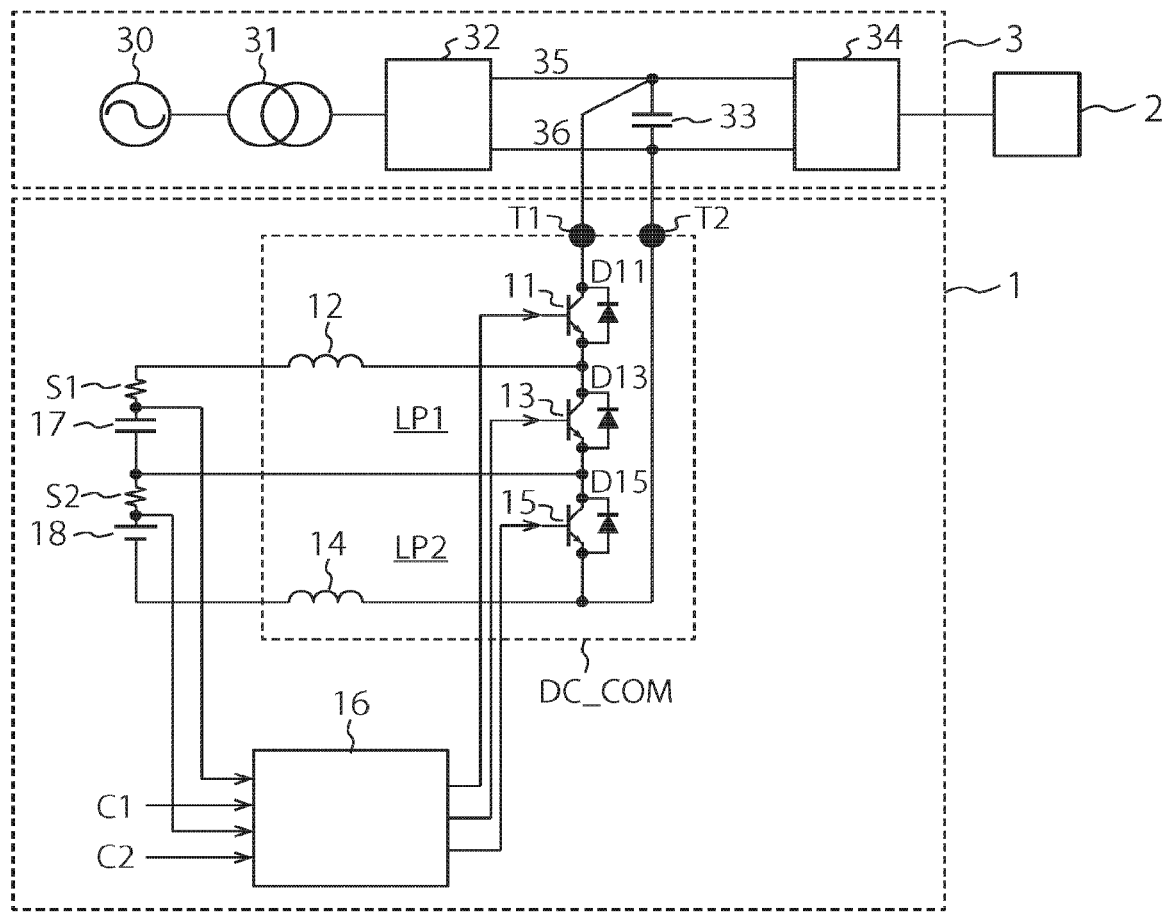
FIG. 13 is a configuration diagram illustrating an example of a charging/discharging apparatus according to a third embodiment.

FIG. 13 is a configuration diagram illustrating an example of a charging/discharging apparatus according to a third embodiment. The charging/discharging apparatus 1 according to the third embodiment is different from that in the first embodiment in that the inductor element 14 is connected to the negative electrode side of the loop LP2. Other configurations of the second embodiment may be identical to corresponding ones of the first embodiment. One end of the inductor element 14 is connected to a node between the switching element 15 and the electrode terminal T2 and the other end of the inductor element 14 is connected to the negative electrode of the second electric storage 18.

In the third embodiment, the controller 16 can discharge the first electric storage 17 without charging or discharging the second electric storage 18, by increasing the duty ratio of the switching element 13 while keeping the duty ratios of the switching elements 11 and 15 low. Meanwhile, the controller 16 can discharge the second electric storage 18 without charging or discharging the first electric storage 17, by increasing the duty ratio of the switching element 15 while keeping the duty ratios of the switching elements 11 and 13 low. That is, the operations of the first and second electric storages 17 and 18 are clearly differentiated by operations of the switching elements, resulting in a configuration with high controllability.

Further, the third embodiment can also obtain effects of the first embodiment. The third embodiment can be combined with the second embodiment. Accordingly, the third embodiment can also obtain effects of the second embodiment.

Figure 14:
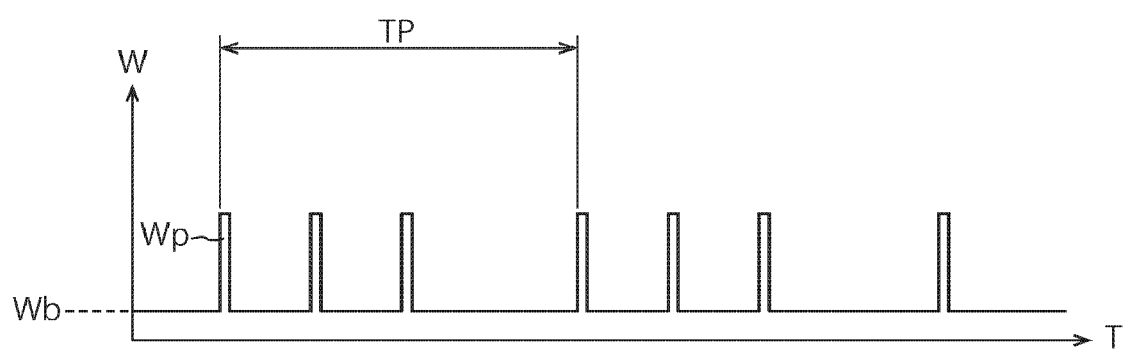
FIG. 14 is a timing chart illustrating an example of a consumed power pattern of the electric load.

FIG. 14 is a timing chart illustrating an example of a consumed electric power pattern of the electric load 2. The vertical axis represents consumed power W and the horizontal axis represents a time T. For example, the electric load 2 continuously consumes electric power Wb as base power and periodically requires high peak electric power Wp. This peak electric power Wp occurs about three times in one period TP.

In order to enable the power supply system 3 to perform the peak shift operation, the first electric storage 17 of the charging/discharging apparatus 1 supplies the peak electric power Wp to the power supply system 3. When the power supply system 3 cannot supply the base electric power Wb due to power outage or the like, the second electric storage 18 of the charging/discharging apparatus 1 supplies the base power Wb to the power supply system 3. In this way, the charging/discharging apparatus 1 can assist the electric power supply function of the power supply system 3.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A charging/discharging apparatus comprising:
   a controller;
   first and second electrode terminals inputting or outputting direct-current power;
   first to third switching elements connected in series between the first electrode and the second electrode;
   a first electric storage connected in parallel to the second switching element located between the first switching element and the third switching element;
   a second electric storage connected in parallel to the third switching element; and
   first to third diodes respectively connected in antiparallel to the first to third switching elements,
   wherein the controller:
   when discharging the first electric storage, increases a duty ratio of the second switching element to be higher than a duty ratio of the first switching element, and
   when discharging the second electric storage, increases the duty ratio of the third switching element to be higher than the duty ratio of the first switching element.

2. The apparatus of claim 1, further comprising:
   a first inductor element interposed in a first loop including the second switching element and the first electric storage, and
   a second inductor element interposed in a second loop including the third switching element and the second electric storage.

3. The apparatus of claim 2, wherein
   one end of the first inductor element is connected to a node between the first switching element and the second switching element, and the other end thereof is connected to the first electric storage, and
   one end of the second inductor element is connected to a node between the second switching element and the third switching element, and the other end thereof is connected to the second electric storage.

4. The apparatus of claim 2, wherein one end of the first inductor element is connected to a node between the first switching element and the second switching element, and the other end thereof is connected to the first electric storage, and one end of the second inductor element is connected to a node between the third switching element and the second electrode terminal, and the other end thereof is connected to the second electric storage.

5. The apparatus of claim 1, wherein the first electrode terminal is at a higher voltage than the second electrode terminal, the first to third switching elements are connected in series in this order from the first electrode terminal to the second electrode terminal, cathodes of the first to third diodes are connected to terminals on a side of the first electrode terminal of the first to third switching elements, respectively, and anodes of the first to third diodes are connected to terminals on a side of the second electrode terminal of the first to third switching elements, respectively.

6. The apparatus of claim 1, wherein the first electric storage is a capacitor, and the second electric storage is a secondary battery, and the controller discharges the capacitor in a case that an electric load consumes a larger current above a preset value, and discharges the secondary battery in a case that a power source supplying electric power to the electric load fails.

7. The apparatus of claim 1, wherein the first electric storage is a secondary battery, and the second electric storage is a secondary battery.

8. The apparatus of claim 1, wherein the controller:

when charging both of the first and second electric storages, increases the duty ratio of the first switching element to be higher than the duty ratio of the second and third switching elements, when charging the first electric storage, increases the duty ratio of the first and third switching elements to be higher than the duty ratio of the second switching element, and when charging the second electric storage, increases the duty ratio of the first and second switching elements to be higher than the duty ratio of the third switching element.

9. The apparatus of claim 1 wherein the controller, when charging the second electric storage while the first electric storage is discharging, decreases the duty ratio of the third switching element to be lower than the duty ratio of the second switching element.

10. The apparatus of claim 1, wherein the controller, when charging the first electric storage while the second electric storage is discharging, decreases the duty ratio of the second switching to be lower than the duty ratio of the third switching element.

* * * * *